: US008689487B2

United States Patent
Gerndorf et al.

(10) Patent No.: US 8,689,487 B2
(45) Date of Patent: Apr. 8, 2014

(54) PANEL FOR A MOTOR VEHICLE

(75) Inventors: Ralf Gerndorf, Finnentrop (DE); Jochen Schulze zur Wiesche, Koeln (DE); Norfried Bittner, Witten (DE); Axel Nuesken, Altena (DE); Martin Schulte, Balve (DE)

(73) Assignee: Dura Automotive Body & Glass Systems GmbH, Plettenberg (DE)

(*) Notice: Subject to any disclaimer, the term of this patent is extended or adjusted under 35 U.S.C. 154(b) by 235 days.

(21) Appl. No.: 12/825,827

(22) Filed: Jun. 29, 2010

(65) Prior Publication Data

US 2010/0327621 A1     Dec. 30, 2010

(30) Foreign Application Priority Data

Jun. 29, 2009   (DE) .................. 10 2009 031 005

(51) Int. Cl.
*E05D 15/16*   (2006.01)
(52) U.S. Cl.
USPC .......................................................... 49/441
(58) Field of Classification Search
USPC .............. 49/440, 441, 475.1, 489.1, 493.1
See application file for complete search history.

(56) References Cited

U.S. PATENT DOCUMENTS

| | | | | |
|---|---|---|---|---|
| 1,582,506 A * | 4/1926 | Bridgwood | .................. | 49/211 |
| 1,919,130 A * | 7/1933 | Reid | ........................... | 428/122 |
| 2,726,894 A * | 12/1955 | Bugbee | ........................ | 49/441 |
| 2,794,757 A * | 6/1957 | Bright | .......................... | 428/122 |
| 2,823,071 A * | 2/1958 | Malpass | ........................ | 49/440 |
| 2,856,230 A * | 10/1958 | Adell | ............................ | 49/462 |
| 2,954,310 A * | 9/1960 | Truesdell et al. | ............ | 428/122 |
| 2,974,383 A * | 3/1961 | Bright | ........................... | 24/564 |
| 2,986,793 A * | 6/1961 | Bright | ........................... | 24/564 |
| 3,154,823 A * | 11/1964 | Horton | ......................... | 428/95 |
| 4,614,061 A * | 9/1986 | Brocke | ........................ | 49/440 |
| 4,653,230 A * | 3/1987 | Seo et al. | ...................... | 49/502 |
| 4,800,681 A * | 1/1989 | Skillen et al. | ................. | 49/440 |
| 5,010,689 A * | 4/1991 | Vaughan | ....................... | 49/440 |
| 5,199,761 A * | 4/1993 | Dannecker et al. | ...... | 296/146.16 |
| 5,339,584 A * | 8/1994 | Ohtake et al. | ................. | 52/208 |
| 5,376,423 A * | 12/1994 | Wiegand | ....................... | 428/99 |
| 6,070,364 A * | 6/2000 | Berry | ......................... | 49/482.1 |
| 6,293,619 B1 * | 9/2001 | Iimori et al. | ............. | 296/216.09 |
| 6,301,834 B1 * | 10/2001 | Tyves | ............................ | 49/441 |

(Continued)

FOREIGN PATENT DOCUMENTS

DE     19741538 A1     3/1999
DE     20201528 U1     6/2003

(Continued)

OTHER PUBLICATIONS

Menges, Georg et al., Spritzgießwerkzeuge. 6. Aufl. München: Carl Hanser, 2007. S. 24. -ISBN 978-3-446-40601-8. 2 pages.

*Primary Examiner* — Jerry Redman
(74) *Attorney, Agent, or Firm* — Alleman Hall McCoy Russell & Tuttle LLP

(57) ABSTRACT

A panel, preferably made of plastic, for a vehicle, in particular for a motor vehicle comprises a U-shaped passage for the reception of a seal which has a first sealing lip which contacts a first limb of the U-shaped passage in an uninterrupted manner and comprises a second sealing lip which contacts the second limb of the U-shaped passage. To improve the sealing effect, the second sealing lip contacts the second limb of the U-shaped passage in an uninterrupted manner.

16 Claims, 1 Drawing Sheet

(56) References Cited

U.S. PATENT DOCUMENTS

| | | | |
|---|---|---|---|
| 6,571,513 B2 * | 6/2003 | Maass | 49/489.1 |
| 7,294,386 B2 * | 11/2007 | Murase et al. | 428/99 |
| 7,316,097 B2 * | 1/2008 | Shiraiwa et al. | 49/441 |
| 7,900,993 B2 * | 3/2011 | Suzuki et al. | 296/146.5 |
| 2001/0013203 A1 * | 8/2001 | Griesbach et al. | 49/440 |
| 2002/0184826 A1 | 12/2002 | Nozaki | |
| 2005/0120633 A1 * | 6/2005 | Takase et al. | 49/441 |

FOREIGN PATENT DOCUMENTS

| | | | |
|---|---|---|---|
| DE | 60123854 T2 | 6/2007 | |
| EP | 0 403 854 A1 * | 12/1990 | |
| EP | 403854 A1 * | 12/1990 | B60J 10/04 |

* cited by examiner

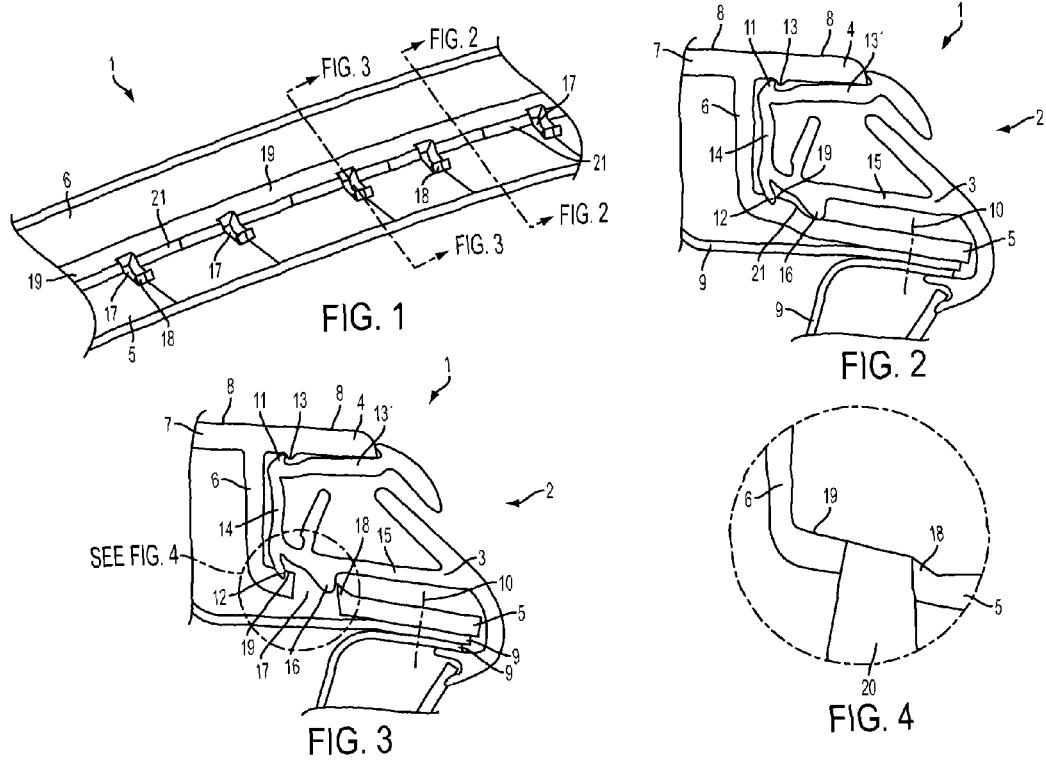

US 8,689,487 B2

PANEL FOR A MOTOR VEHICLE

CROSS REFERENCE TO RELATED APPLICATION

This application claims priority to German Patent Application No. 10 2009 031 005.3, entitled "Panel for a Motor Vehicle", filed Jun. 29, 2009, which is hereby incorporated by reference in its entirety for all purposes.

BACKGROUND AND SUMMARY

The present disclosure relates to a panel or to another trim part for a vehicle, in particular for a motor vehicle.

The panel may be made of plastic. It has a U-shaped passage which serves the reception of a seal. The seal is introducible or introduced into the U-shaped passage. The U-shaped passage is outwardly open. It includes a base, a first limb and a second limb. The limbs are disposed opposite one another. The base connects the two limbs. It is sufficient if the passage is essentially of U-shape.

The seal has a first sealing lip which is contactable or contacts a first limb of the U-shaped passage in an uninterrupted manner and has a second sealing lip which is contactable or contacts the second limb of the U-shaped passage.

A panel for a vehicle having a U-shaped passage for reception of a seal is known from DE 202 01 528 U1. DE 197 41 538 A1 shows a similar panel.

A frame system for windows of a motor vehicle which includes an outer frame and a shaped inner frame is comprised by DE 601 23 854 T2. The outer frame receives a shaped guide rail having a U-shaped cross-section, with the guide rail having sealing lips at its outer side.

US 2002/0184826 A1 discloses a seal for a movable window glass of a motor vehicle door in which a U-shaped seal is located in an L-shaped frame part.

It is the object of the present disclosure to improve the sealing effect of the seal in such a panel.

This object is solved in accordance with the present disclosure by a panel, which may be made of plastic, for a vehicle, in particular for a motor vehicle, having a U-shaped passage for the reception of a seal which has a first sealing lip which contacts a first limb of the U-shaped passage in an uninterrupted manner. The second sealing lip contacts the second limb of the U-shaped passage in an uninterrupted manner. The second sealing lip hereby forms an uninterrupted sealing line. The second sealing lip furthermore exerts an uninterrupted pressure onto the first sealing lip, whereby the sealing effect of the first sealing lip is also improved.

It is advantageous if the panel is closed between the sealing lips. In particular no openings are present in the panel between the sealing lips. It is hereby ensured that moisture, in particular water, in particular driving rain or water in a car wash and/or from a high-pressure cleaner, which are not held back by the first sealing lip can be caught by the second sealing lip without them being able to pass through openings present in the panel in this manner. The sealing lips also seal acoustically; they protect against external acoustic influences, in particular against airflow, external noises and/or wind noise.

A further advantageous further development is that a limb of the U-shaped passage has holding ribs spaced apart from one of the sealing lips. It is also possible that only one holding rib is present. It is, however, more favorable if a plurality of holding ribs, in particular short holding ribs, are provided. The holding ribs may be on a line, with this line also being able to be bent or curved. The holding ribs are located outside the sealing lip, that is, at a point of the limb of the U-shaped passage which is spaced apart from the support point of the sealing lip in the outward direction. The seal can be supported at the holding ribs. It is advantageous if a corresponding holding lip which is supported at the holding ribs is present at the seal.

In accordance with a further advantageous further development, the holding ribs are provided at the rims of openings in the limb of the U-shaped passage. The holding ribs are located at the outer rims of the openings.

The spacing of the holding ribs from the oppositely disposed limb of the U-shaped passage is larger than or equal to the spacing of the outer rims of the openings from the oppositely disposed limb of the U-shaped passage. To achieve this, a step can be provided in the limb of the U-shaped passage in which the openings are located. An undercut in the panel is avoided by the mentioned spacing ratio, which in particular facilitates the manufacture of the panel from plastic in a plastic injection molding process.

A further advantageous further development is characterized in that a holding lip is provided at the seal and contacts the inner side of the second limb of the panel.

It is advantageous if the holding lip contacts the holding ribs of the second limb of the panel. An embodiment of the present disclosure will be explained in detail in the following drawings.

BRIEF DESCRIPTION OF THE FIGURES

FIG. 1 shows a part of a panel for a motor vehicle in a perspective representation.
FIG. 2 shows a section along the line A-A in FIG. 1.
FIG. 3 shows a section along the line B-B in FIG. 1.
FIG. 4 shows an enlarged detail from FIG. 3.

DETAILED DESCRIPTION

FIG. 1 shows a panel 1 made of plastic for a motor vehicle. The panel includes, as can also be seen from FIGS. 2 and 3, a U-shaped passage 2 which receives a seal 3. In one example, the U-shaped passage may be formed as a channel. The U-shaped passage 2 includes a first limb 4 and a second limb 5 which are connected to one another by a base 6. The first limb 4 is formed by an extension of the cover part 7 of the panel 1. The outer surface 8 of the cover part 7 and of the first limb 4 forms the visible surface of the panel which is visible to the outside when the panel 1 is fastened to the motor vehicle, as is shown in FIGS. 2 and 3.

The second limb 5 is fastened to the metal car body panels 9 or to corresponding metal door panels, and indeed by a screw or by a rivet or by a similar fastening element whose fastening axis is marked by 10.

The seal 3 has a first sealing lip 11 which contacts the first limb 4 of the U-shaped passage 2 in an uninterrupted manner. The seal 3 furthermore has a second sealing lip 12 which likewise contacts the second limb 5 of the U-shaped passage 2 in an uninterrupted manner.

A second holding rib 13, which extends into the U-shaped passage 2 and which contacts the first sealing lip 11, is provided at the inner side of the first limb 4. The second holding rib 13 serves for the holding of the first sealing lip 11.

The panel 1 is closed between the sealing lips 11, 12. No openings are present in the panel in this region which is formed by a part of the first limb 4, by the base 6 and by a part of the second limb 5. Moisture and/or noise which penetrate from the outside are held back by the first sealing lip 11. If a small portion of the moisture or of the noise overcomes the first sealing lip 11 it moves along the base 6 to the second sealing lip 12, where it is finally held back. Since the panel 1 is closed on the path from the first sealing lip 11 to the second sealing lip 12, moisture and/or noise cannot penetrate inwardly into the vehicle in this way.

The seal 3 likewise has a substantially U shape. The first limb 13' of the seal 3 contacts the inner side of the first limb 4 of the panel 1. The base 14 of the seal 3 extends in the region of the base 6 of the panel 1. The second limb 15 of the seal 3 extends substantially parallel to the second limb 5 of the panel 1. The first sealing lip 11 contacts the connection point of the first limb 13' and of the base 14 of the seal 3. The second sealing lip 12 is located at the connection point of the base 14 and of the second limb 15 of the seal 3.

A holding lip 16 is provided at the second limb 15 of the seal 3. The holding lip 16 faces outwardly from the second limb 15, that is, toward the second limb 5 of the panel 1. It contacts the inner side of the second limb 5 of the panel.

As can in particular be seen from FIGS. 1 and 3, openings 17 are provided in the second limb 5 of the panel 1. The holes 17 are substantially on one line. First holding ribs 18 are provided at the rims of the openings 17. The first holding ribs 18 are located at the outer rims of the openings 17, that is, at the rims of the openings 17 remote from the base 6. The first holding ribs 18 project upwardly from the plane of the second limb 5, that is, into the U-shaped passage 2.

The openings 17 are spaced apart from the base 6 of the panel 1. The openings 17 and the first holding ribs 18 are located outside the second sealing lip 12, that is, at a point of the second limb 5 which is spaced apart from the support point 19 of the second sealing lip 12 in the outward direction, as can in particular be seen from FIG. 3. It is hereby ensured that the second sealing lip 12 can contact the support point 19 in an uninterrupted manner. The second sealing lip 12 can thus develop an unrestricted sealing effect over its total length. Furthermore, a pressure is generated on the seal 3 by the support of the second sealing lip 12, said pressure acting along its base 14 up to the first sealing lip 11 and pressing it toward the first limb 4 of the panel 1 in an uninterrupted manner.

The holding lip 16 of the seal 3 contacts the first holding ribs 18 of the second limb 5 of the panel 1. It is supported at these first holding ribs 18 and holds the seal 3 in the U-shaped passage 2 in this manner.

As can in particular be seen from FIG. 3, the spacing of the first holding ribs 18 from the oppositely disposed first limb 4 of the U-shaped passage 2 is larger than the spacing of the inner rims of the openings 17 from the oppositely disposed first limb 4 of the panel 1. The inner rim of the respective opening 17 is in this respect formed by the outer end of the support point 19. It is ensured by the mentioned spacing relationship that the slider of the injection molding mold for the panel can be moved out of the U-shaped passage 2, with this movement taking place in the direction to the right in the representation of FIGS. 2 and 3. In this direction, no undercut is formed by the mentioned spacing relationship which could impede the outward movement of the slider.

Furthermore, it can be achieved by this spacing relationship that the core 20 of the injection molding tool generating the openings 17 does not impede the mold removal of the plastic panel, as shown in FIG. 4. In the injection molding process, the core 20 is located where the openings 17 are formed.

A step 21 which forms a vertical difference between the outer region of the second limb 5 and its inner region is provided for the generation of the mentioned spacing relationship in the second limb 5 of the panel 1. The first holding ribs 18 are located in the outer region and the support point 19 is located in the inner region. The support point 19 is closer than the outer region of the second limb 5 to the oppositely disposed first limb 4.

A panel made of plastic is provided by the present disclosure which has a passage for the reception of a seal. The seal is held in shape-matched manner in the panel. Two sealing lips contact the inner side of the reception passage in an uninterrupted manner in each case. They form two through-going sealing lines in this manner. The panel has no openings between the two sealing lips. A holding lip is furthermore shaped at the seal and is supported at the rims of openings in the panel. A step is shaped in the limb of the panel in which the openings are provided so that the second sealing lip and the holding lip can be disposed on different planes, whereby an undercut in the tool is avoided. FIGS. 2 and 3 show a horizontal section through a drop window seal. The window is framed by the U-shaped opening of the seal 3. The window is, however, not shown graphically.

The invention claimed is:

1. A panel, for a vehicle, having an integrally-formed U-shaped mount for reception of a seal, the U-shaped mount having a first limb and a second limb, the first and second limbs connected by a base, the seal having a first sealing lip in uninterrupted contact with the first limb of the U-shaped mount, and a second sealing lip in uninterrupted contact with the second limb of the U-shaped mount, wherein one limb of the U-shaped mount comprises first holding ribs spaced apart from the sealing lip contacting that limb, wherein there are openings through the one limb of the U-shaped mount, the openings having inner rims and outer rims, the outer rims remote from the base, and wherein the first holding ribs are provided at the outer rims of the openings.

2. The panel in accordance with claim 1, wherein the panel is closed between the sealing lips.

3. The panel in accordance with claim 2, wherein the U-shaped mount is formed as a U-shaped channel.

4. The panel in accordance with claim 1, wherein a spacing of the first holding ribs from an oppositely disposed limb of the U-shaped mount is larger than or equal to a spacing of inner rims of the openings from the oppositely disposed limb of the U-shaped mount.

5. The panel in accordance with claim 1, wherein a holding lip which contacts an inner side of the second limb of the panel is provided at the seal.

6. The panel in accordance with claim 5, wherein the one limb comprising first holding ribs is the second limb, and wherein the holding lip contacts the first holding ribs of the second limb of the panel.

7. The panel in accordance with claim 1, wherein the panel is made of plastic, and wherein the vehicle is a motor vehicle, wherein the panel further includes openings through the second limb, but has no openings between the two sealing lips.

8. A panel for a vehicle, the panel made of plastic and including an integrally-formed U-shaped mount for reception of a seal, the mount having inner sides formed by first and second limbs, the first and second limbs connected by a base, the panel further including through openings having inner rims and outer rims, the outer rims remote from the base, the seal received in a shape-matched manner in the U-shaped mount, the seal including first and second sealing lips in uninterrupted contact with inner sides of the first and second limbs, respectively, the contacts respectively forming two throughgoing sealing lines across a total length of the U-shaped mount, wherein the panel has no openings between the two sealing lips, the seal further including a holding lip supported at the outer rims of the through openings.

9. The panel of claim 8, wherein the through openings are provided through the second limb of the panel.

10. The panel of claim 9, wherein a step is shaped in the second limb of the panel so that the second sealing lip and the holding lip are disposed on different planes.

11. A plastic door panel of a motor vehicle, the panel including an integrally-formed U-shaped mount for reception of a seal, the seal having a first sealing lip in uninterrupted contact with a first limb of the U-shaped mount and having a second sealing lip in uninterrupted contact with a second limb of the U-shaped-mount, the first and second limbs connected by a base, each of the sealing lips contacting respective limbs to form respective unrestricted sealing over their respective total lengths, wherein one limb of the U-shaped mount comprises first holding ribs spaced apart from the sealing lip contacting that limb, wherein there are openings through the one limb of the U-shaped mount, the openings having inner rims and outer rims, the outer rims remote from the base, the first holding ribs provided at the outer rims of the openings.

12. The panel in accordance with claim 11, wherein the panel is closed between the sealing lips.

13. The panel in accordance with claim 12, wherein the U-shaped mount is formed as a U-shaped channel.

14. The panel in accordance with claim 11, wherein a spacing of the first holding ribs from an oppositely disposed limb of the U-shaped mount is larger than or equal to a spacing of inner rims of the openings from the oppositely disposed limb of the U-shaped mount.

15. The panel in accordance with claim 14, wherein a holding lip which contacts an inner side of the second limb of the panel is provided at the seal.

16. The panel in accordance with claim 15, wherein the first holding ribs are holding ribs in the second limb of the panel, the holding lip contacting the first holding ribs of the second limb of the panel.

* * * * *